(12) United States Patent
Ackermann et al.

(10) Patent No.: US 6,211,876 B1
(45) Date of Patent: *Apr. 3, 2001

(54) METHOD AND SYSTEM FOR DISPLAYING ICONS REPRESENTING INFORMATION ITEMS STORED IN A DATABASE

(75) Inventors: Edith Ackermann, Cambridge; Dennis Nathan Bromley, Arlington; David Ray DeMaso, Wellesley; Sara Frances Frisken Gibson, Arlington; Joseph Gonzalez-Heydrich, Dorchester; Judith Galler Karlin, Wellesley; Joseph Marks, Belmont; Chia Shen, Arlington; Carol Strohecker, Cambridge, all of MA (US)

(73) Assignee: Mitsubishi Electric Research Laboratories, Inc., Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,258

(22) Filed: Jun. 22, 1998

(51) Int. Cl.[7] .............................. G06F 3/00; G06F 17/30; G06F 17/27
(52) U.S. Cl. .................... 345/348; 345/339; 345/968; 704/239; 707/3
(58) Field of Search .......................... 345/329, 334–335, 345/339, 348, 355, 440, 968; 704/4, 239, 251; 705/3; 707/3–6

(56) References Cited

U.S. PATENT DOCUMENTS

| | | | |
|---|---|---|---|
| 4,839,853 | * | 6/1989 | Deerwester et al. ...................... 707/5 |
| 5,598,557 | * | 1/1997 | Doner et al. ............................. 707/5 |
| 5,619,709 | | 4/1997 | Caid et al. ............................. 707/532 |
| 5,625,767 | * | 4/1997 | Bartell et al. ......................... 345/440 |
| 5,636,350 | * | 6/1997 | Eick et al. ............................. 345/440 |
| 5,664,109 | * | 9/1997 | Johnson et al. ....................... 705/3 X |
| 5,794,178 | * | 8/1998 | Caid et al. ........................ 345/440 X |
| 5,847,708 | | 12/1998 | Wolff ..................................... 345/349 |

(List continued on next page.)

FOREIGN PATENT DOCUMENTS

0736834 A2  9/1996  (EP) .
WO 98/01955  1/1998  (WO) .

OTHER PUBLICATIONS

JS Risch et al., "The Starlight Information Visualization System", IEEE, p. 42–49, 1997.*
Nancy E. Miller et al., "Topic Islands– A Wavelet–Based Text Visualization System", IEEE, p. 189–196, 532, 1998.*
Nabil R. Adam et al., "Content–Based Retrieval in Digital Libraries", Technical Activities Forum, p. 93–94, 1997.*

(List continued on next page.)

Primary Examiner—Raymond J. Bayerl
Assistant Examiner—X. L. Bautista
(74) Attorney, Agent, or Firm—Dirk Brinkman (57) ABSTRACT

Methods and apparatus are provided for accessing an experience journal which includes unstructured text items relating to a topic, such as a medical condition. The method is implemented in a computer system including a processor, a storage device, a video display unit having a display screen, and a user interface. The unstructured text items are stored in the storage device. Similarities among the unstructured text items are determined, and icons, one corresponding to each of the unstructured text items, are displayed on the display screen. The icons are positioned on the display screen relative to each other, such that the distances between icons are representative of the determined similarities among the unstructured text items. In response to user selection of one of the icons, the corresponding unstructured text item is displayed on the display screen.

21 Claims, 8 Drawing Sheets

U.S. PATENT DOCUMENTS 5,867,821 * 2/1999 Ballantyne et al. .................. 705/3 X
5,895,470 * 4/1999 Pirolli et al. .......................... 707/4 X
5,982,369 * 11/1999 Sciammarella et al. ......... 345/968 X

OTHER PUBLICATIONS

Ruocco et al., "Clustering and Classification of Large Document Bases in a Parallel Environment"; *Journal of the American Society for Information Science*; vol. 48, No. 10; Oct. 1997; pp. 932–943.

R.R. Korfhage; "To See, or Not to See–Is that the Query?"; *Proceedings of the Annual International ACM/SIGIR Conference on Research and Development in Information Retrieval*; Oct. 1991, pp. 134–141.

Poston et al.; "High Dimensional Data Computational Demand Minimization"; *Proc. Of the SPIE (The International Society for Optical Engineering)*; April, 1998, pp. 471–479.

* cited by examiner

Speaking to Doctors

I'm a doctor, but I am also a parent. I have learned in my work that parents who advocate for the child's care are very helpful to my work. Parents know their children's emotional and behaviors much better than I. I appreciate their participation in the care with their questions, concerns, input, and etc. I also know this can be difficult.

How? I learned this 10 years ago as a parent. My own child was facing possible cardiac surgery. As this was being discussed, I realized there were differences of opinion between the hospital doctors. After going around with this, I went and spoke with our pediatrician. I asked him to help us figure out the best plan which, he was more than willing to do.

As I returned to the hospital, I was surprised to find myself feeling frightened for my child. I thought what had I done by speaking with the pediatrician. I might upset the very people caring for my son. This sudden terror was just that terror. My rational side told me that I knew this would move things forward for my son. It was then I knew the fear that must come to the parents that I see. As a doctor, I had the advantage of understanding more fully what was happening. But nearly all my patients are not doctors.

Experience Journal

Fig. 8

Child Care In & Out of the Hospital

David is 2 1/2 years old. He was in the hospital for 10 days. He had a twin brother and older sister at home. My wife and I dealt with the hospital in the following way.

We began by assuming two things. First, that David being so young would need someone with him nearly all the time. We just wanted to be there for him. We did not care or want to go to procedures, but be present for him. Second, that we had to care also for our children at home. We do not have family Included
the bottom line doctor title ...
child care in f netscape ...
looking back please tell me ...
the place that makes me ...
speaking to doctors title speaking ...
strength in the heart title ...
aaron s story title aaron Submitted Hold Set Threshold

Fig. 9

METHOD AND SYSTEM FOR DISPLAYING ICONS REPRESENTING INFORMATION ITEMS STORED IN A DATABASE

FIELD OF THE INVENTION

This invention relates to methods and apparatus for providing computerized access to an experience journal containing unstructured text items relating to a topic and, more particularly, to a computerized experience journal wherein text items are automatically arranged according to similarity and wherein text items of interest can be accessed with extreme ease.

BACKGROUND OF THE INVENTION

Medical advances make it increasingly possible for children with previously fatal illness to live and thrive. However, a significant number still experience repeated operations, hospitalizations and invasive procedures, or need special care at home. Many do so with little or no intervention to help them and their families cope with the emotional stresses involved. Serious medical illness is, therefore, increasingly recognized as an important early risk factor for emotional disturbance.

A variety of interventions have been developed to assist patients and their families with the hope of improving the resiliency of both. These include pre-admission hospital preparatory programs, meetings between families and physicians, books and videos for children of different ages and psychiatric consultation. Yet it is clear that the majority of families are not able to avail themselves of these resources before coming to the hospital.

One additional and potentially underutilized source of psychological support is the community of patients and families who have experienced hospitalization. However, in spite of a general willingness to share experiences, communication among patients and families is usually limited. To facilitate this process, the use of computer technology to record, organize and display stories about the experiences of families with children who have been treated for serious illness has been proposed. Children and their families are asked to record text and multimedia vignettes describing some aspect of their illness, coping strategies or care that might be useful to others. The collection of text and vignettes is referred to as an experience journal.

A difficulty arises in providing access to the items in the experience journal. The text items are highly unstructured and differ greatly in style, content and sophistication. The items may be prepared by anyone from a physician or a parent to a young child. Thus, organizing the text items for access is extremely difficult. The user group likewise may vary from medical professionals to parents to very young children. Thus, the text items must be available to users with limited computer skills. Because the text items are unstructured and differ greatly in content, existing techniques of index, classification and search are not useful. Accordingly, there is a need for methods and apparatus for organizing and providing access to an experience journal which includes unstructured text items relating to a topic.

SUMMARY OF THE INVENTION

According to a first aspect of the invention, methods and apparatus for providing access to an experience journal including unstructured text items relating to a topic are provided. The method is implemented in a computer system comprising a processor, a storage device, a video display unit having a display screen, and a user interface. The computer system executes the steps of storing the unstructured text items in the storage device, determining similarity among the unstructured text items and displaying icons, one corresponding to each of the unstructured text items on the display screen. The icons are positioned on the display screen relative to each other such that the distances between icons are representative of the determined similarities among the unstructured text items. In response to user selection of one of the icons, the corresponding unstructured text item is displayed on the display screen.

The similarity among the unstructured text items may be determined by analyzing the unstructured text items for use of the same words. In particular, stop words may be removed from the text items and suffixes may be removed from words in the text items. The remaining words in the text items are weighted according to the inverse of their occurrence frequency in a reference text to provide a word vector for each of the text items. A similarity score is determined for each pair of unstructured text items by determining the dot product of the corresponding word vectors.

The icons are preferably positioned relative to each other by multidimensional scaling of the determined similarities among the unstructured text items.

A new text item may be entered into the experience journal after optional review and editing by a screening committee by determining similarity between the new text item and other text items in the experience journal, displaying a new icon corresponding to the new text item on the display screen and positioning the new icon relative to other icons such that the distances between the icons are representative of the determined similarities among the text items.

The experience journal may be implemented as a website on the World Wide Web. Alternatively, the experience journal may be implemented on a local area network, on a single computer or on a combination of the World Wide Web and one or more local area networks. The principal user functions include accessing entries in the experience journal and submitting new entries for inclusion in the experience journal.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
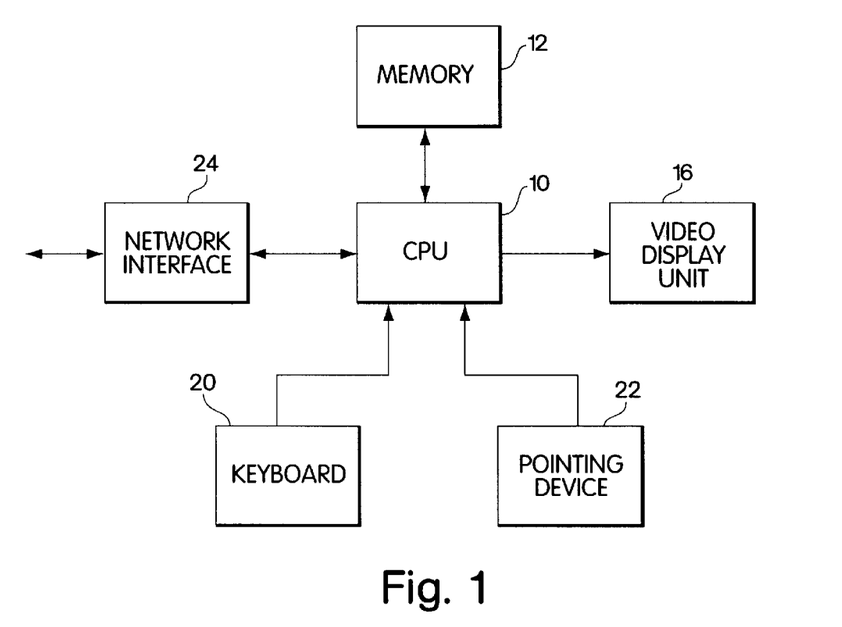
FIG. 1 is a block diagram of a computer system suitable for implementing the present invention.

FIG. 1 is a block diagram of an example of a computer system that may be used in implementing the present invention. A central processing unit (CPU) 10 is connected to a memory 12 that stores instructions to be executed by the CPU 10. The memory 12 can be any type of memory, including RAM, ROM, CD ROM, magnetic disk, hard disk, etc. Data relating to execution of the instructions may also be stored in the memory 12. Alternatively, different memories can be used for the instructions and the data. The CPU 10 is also connected to a video display unit 16 for displaying information to a user. The user can input information to the CPU through a user interface including a keyboard 20 and a pointing device 22, such as a mouse or a trackball. A network interface 24 connected to CPU 10 may be used to interface the computer system to a local area network (LAN) or a wide area network (WAN), such as the World Wide Web. It will be understood that the computer system may have a variety of different components, configurations and capabilities within the scope of the present invention.

Figure 2:
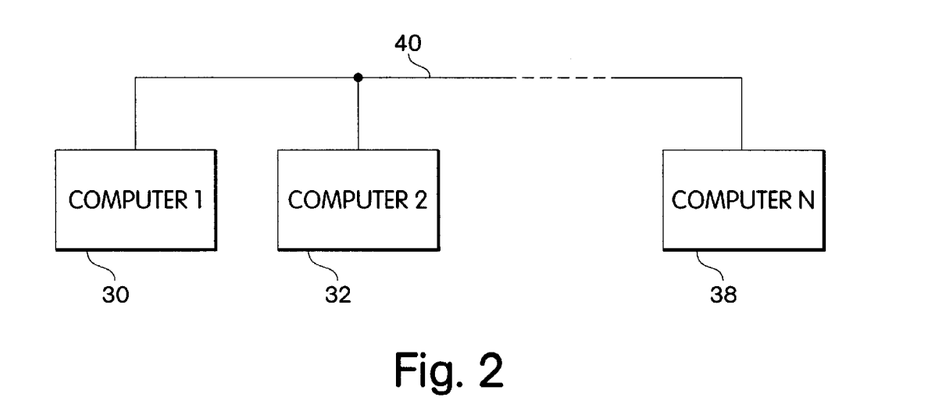
FIG. 2 is a block diagram of a computer network suitable for implementing the present invention.

A computer network suitable for implementation of the present invention is shown in FIG. 2. Computers 30, 32, . . . 38 are interconnected on a network 40 which may be a LAN, the World Wide Web or a combination of a LAN and the World Wide Web. One of the computers, such as computer 30, may be designated as a website for the computerized experience journal of the invention. The computer 30 may be used for control of the experience journal by a screening committee as described below. The remaining computers may access text entries in the experience journal through network 40 and may submit new text items for inclusion in the experience journal.

One purpose of the invention is to provide a way for a community to gather, organize and share the community's collective wisdom on a given topic or issue in an experience journal. In one example, the community includes the families of children who have been through a cardiac unit at a hospital. Families can contribute to the experience journal by submitting personal narratives about their experiences, helpful information, poems and stories, as well as pictures and video about the experience of coping with a serious illness.

One feature of such personal narratives is that they are quite unlike the logically structured and uniform text that is found in media such as encyclopedia articles and newspaper stories. In general, the personal narratives may be considered unstructured, anecdotal text. Much of the accepted wisdom about text-based information retrieval has been developed for more structured text data. For example, in structured text data, researchers have found that specification of an indexing or a classification scheme can be useful. However, in an experience journal, it may be difficult to predict the topics that contributors will want to address, and restricting contributions to a predefined set of topics is an unacceptable constraint.

Another key distinction is that an experience journal should lend itself to browsing. The type and degree of organization needed to support effective browsing is very different from that which is needed to support effective querying. Therefore, the fundamental operation in an experience journal tends not be "find an entry with the following keywords", so much as "find an entry that is related to the one I just read" or "find an entry that is very different from the one I just read".

An important characteristic of an experience journal is that it will grow and evolve continuously over time, even while people are reading it. For this reason, a preset limit on the size of an experience journal is unacceptable. Furthermore, contributors will hope to see an entry included within the experience journal soon after writing it. Therefore, a model wherein successive experience journal versions are produced and released at intervals may be undesirable.

Contributions to an experience journal will come from many individuals in many styles and forms. In order to make authoring and submission as easy as possible, minimal assumptions are made about the form of an experience journal entry.

Websites that contain experience journal data can be organized and maintained by a human webmaster. However, sufficient funds to pay a professional webmaster may not be available. Accordingly, the experience journal should be self-organizing and self-evolving, and should be capable of operating indefinitely without supervision or intervention by specifically trained people.

In addition to being able to browse an experience journal within a hospital, participating families should be able to access it over the Internet, using a variety of different web browsers. Furthermore, users with only the basic computer skills should be able to browse an experience journal. For this reason, the interface to the experience journal preferably uses simple point and click actions rather than more sophisticated access and browsing models, such as Boolean queries or tailored databases.

Figure 3:
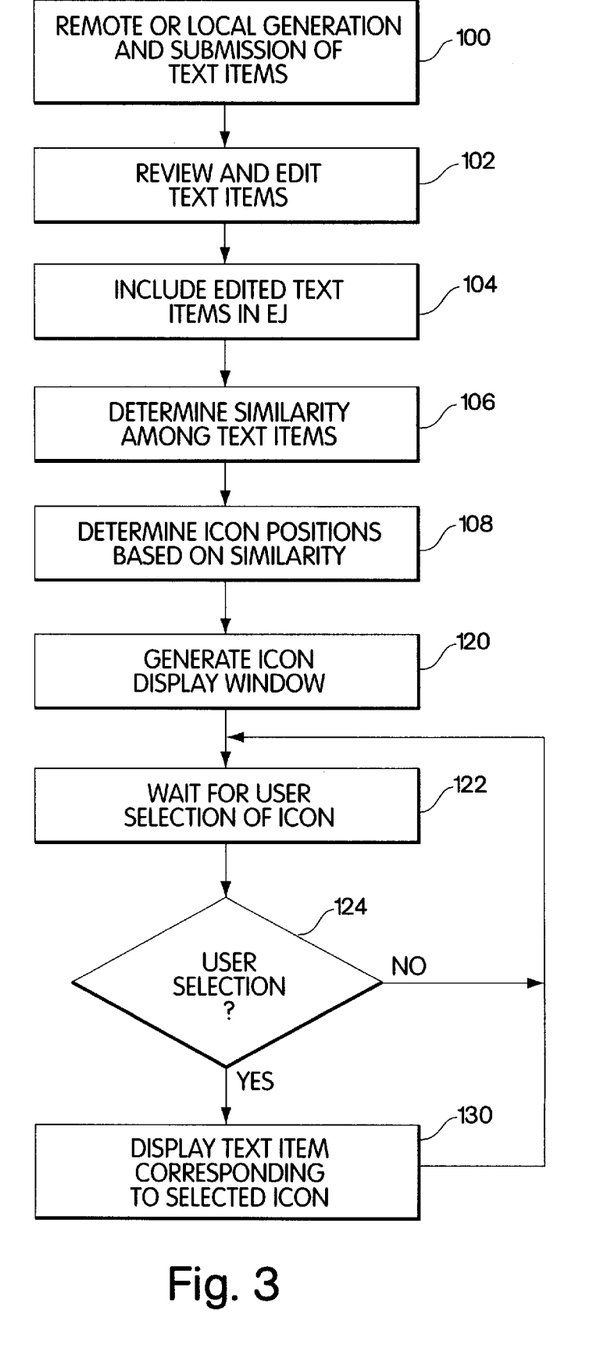
FIG. 3 is a flow chart of the operation of an experience journal in accordance with an embodiment of the invention.

A flow chart of the operation of the experience journal in accordance with the invention is shown in FIG. 3. Major functions available to the user include submission of text items for inclusion in the experience journal and access to text items in the experience journal. A particular user may be involved with either or both functions.

A text item for entry into the experience journal can be a HTML document (created with Netscape Navigator Gold or Microsoft Front Page, for example), an ASCII text file or a URL for either type of file. After it is composed by a contributing patient or family in step 100, a text item for the experience journal may be communicated by e-mail to the members of a screening committee, which may be composed of members of the hospital staff and parents of present and former patients. The task of the committee is to review the submitted text entry in step 102 to determine whether the text item should be entered into the experience journal as submitted or whether it should be edited to eliminate material that could be medically harmful or legally compromising. The text item may be edited as necessary. When committee acceptance is given, the text item is then translated automatically into HTML format, if necessary, and is incorporated into the experience journal in step 104.

Figure 7:
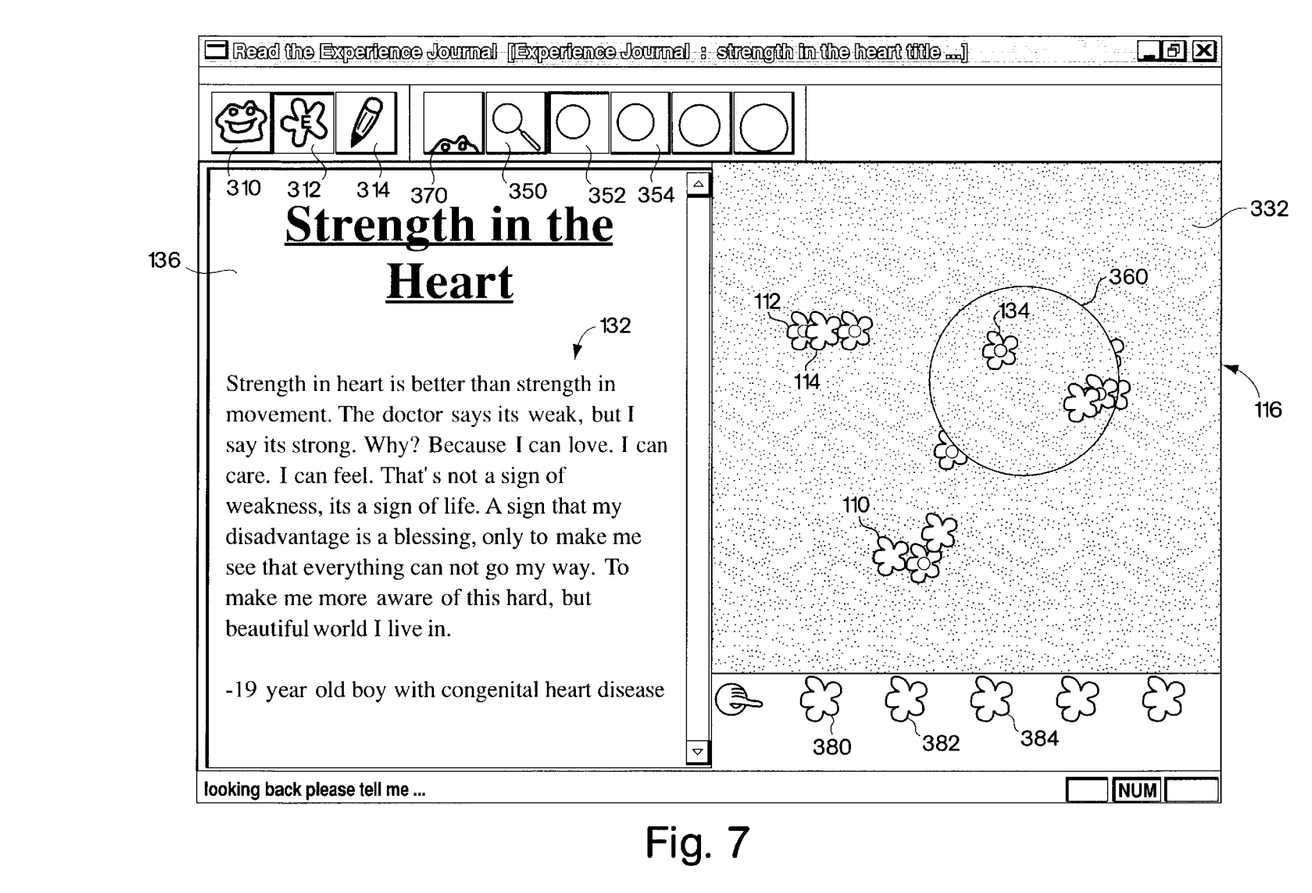
FIG. 7 illustrates an example of an icon display window containing icons that represent text items in the experience journal.

The relationship of the new entry to existing experience journal entries must be established. In step 106, the similarity among the text items in the experience journal is determined. The similarity between each pair of text items is quantified as a similarity score as described in detail below in connection with FIG. 4. The similarity scores are used in step 108 to determine icon positions in a display window. In particular, each text item in the experience journal is represented by an icon 110 in a display window 116, as shown in FIG. 7. The icons are positioned in the display window 116 relative to each other, such that the distances between the icons are representative of the determined similarities among the text items. Thus, for example with reference to FIG. 7, icons 112 and 114 represent text items that have a high degree of similarity, whereas icons 110 and 112 represent text items that have a relatively low degree of similarity. A preferred technique for determining icon positions is described below in connection with FIG. 5. After the icon positions have been determined, the icon display window 116 is generated in step 120. As indicated above, the positions of the icons in the display are indicative of similarity. Thus, groups of icons correspond to similar text items in the experience journal.

The experience journal is then available for access by users. In step 122, the process waits for user selection of an icon, typically by pointing and clicking with pointing device 22 (FIG. 1). In step 124, a determination is made as to whether a user selection has been made. When a user selection has not been made, the process continues to wait in step 122. When a user selection is made, the text item corresponding to the selected icon is displayed in step 130. As shown in FIG. 7, a selected text item 132 is displayed in a text window 136 in the left side of the display screen. An icon 134 corresponding to the text item 132 may be highlighted for reference by the user in selecting similar or dissimilar text items.

Figure 4:
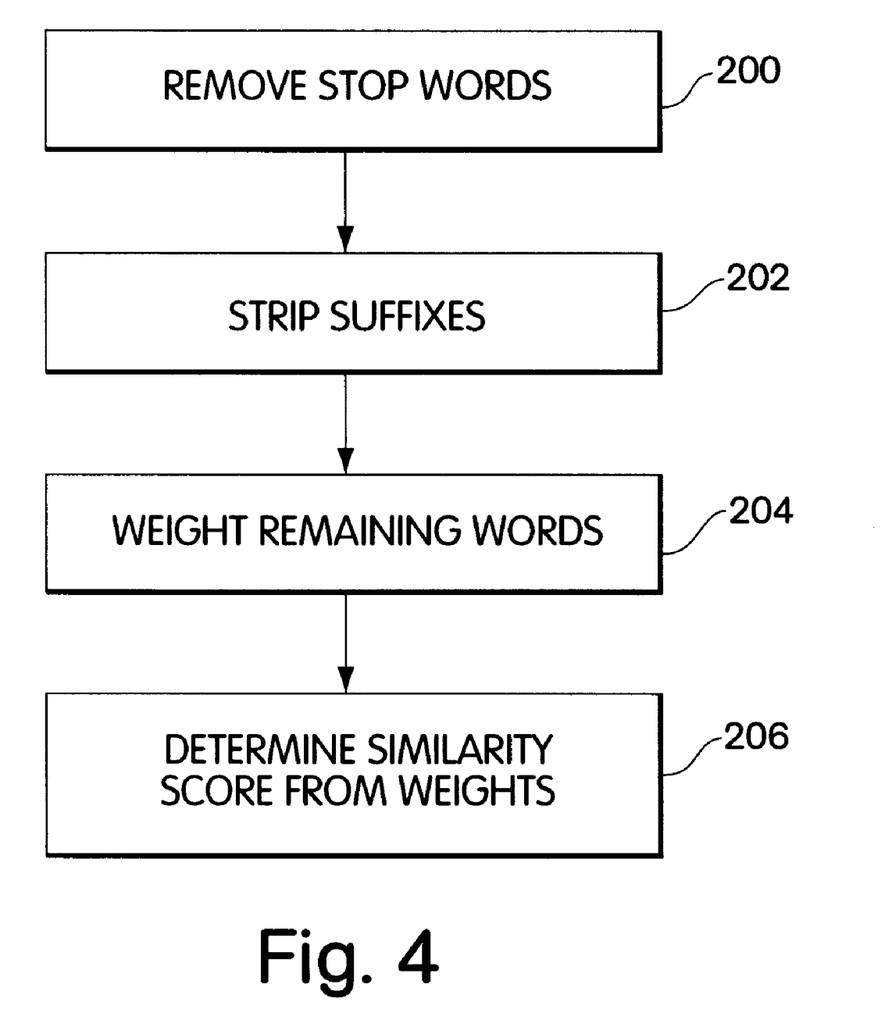
FIG. 4 is a flow chart of an example of a process for determining similarity between text items shown in FIG. 3.

A flowchart of an example of a process for determining similarity among text items in the experience journal is shown in FIG. 4. In step 200, stop words are removed from each text entry. Stop words, such as "the", "and", "is", etc., are those words which occur with such high frequency in the text as to be useless for determining similarity in meaning between text items. In step 202 suffixes, such as "ly", "ing", etc., are stripped from the words in the text items. In step 204, the remaining words in each text item are weighted according to the inverse of their occurrence frequency in a large reference text. Thus, rarely used words are weighted heavily, and commonly used words are discounted. The weights for each text item are represented as a word vector. A similarity score for a pair of text items is determined in step 206 as the dot product of the word vectors associated with the two text items. The procedure of FIG. 4 is repeated for each pair of text items in the experience journal, thus providing measures of similarity among all the text items in the experience journal. Techniques for determining similarity between texts based on similarity scores are described by G. Salton in *Automatic Text Processing: The Transformation. Analysis and Retrieval of Information by Computer*, Reading, MA: Addison-Wesley, 1989, chapters 8–10.

The similarity scores for the pairs of text items in the experience journal are used to determine the positions of the icons in the display window 116. The technique of multidimensional scaling may be used to position icons so that similar entries in the experience journal are located near each other in the display window and dissimilar entries are located far apart. Thus, proximity rather than coordinate location is the measure of similarity. Clusters of similar entries form naturally. Techniques for multidimensional scaling are described by I. Borg et al in *Modern Multidimensional Scaling: Theory and Applications, Berlin*: Springer, 1997 and by J. B. Kruskal in "Multidimensional Scaling and Other Methods for Discovering Structure", *Statistical Methods for Digital Computers*, Englein, Ralston, Wilf (eds.), vol. 3, Wiley, pages 296–335.

Figure 5:
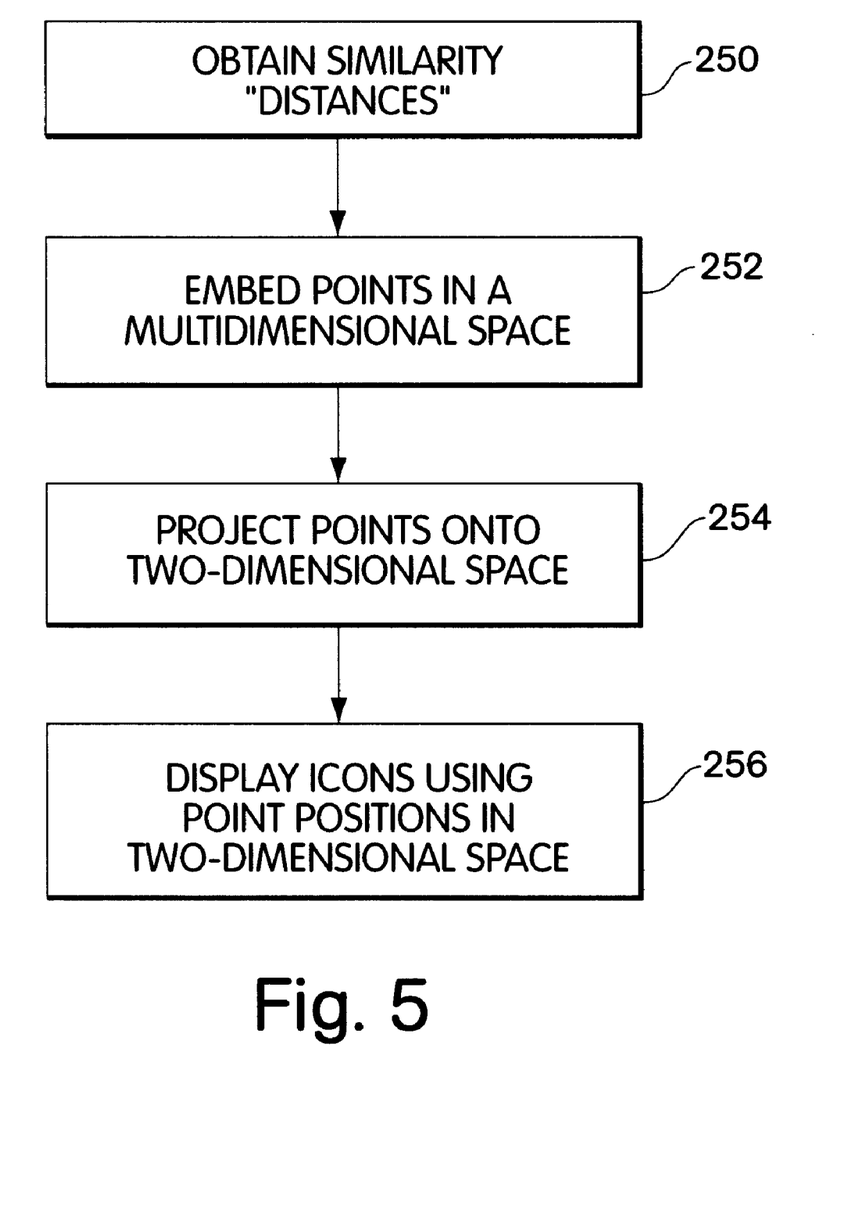
FIG. 5 is a flow chart of an example of a process for determining icon positions shown in FIG. 3.

A flow chart of the process for determining icon positions on the display screen is shown in FIG. 5. The similarity scores, or "distances", are obtained from the process of FIG. 4 in step 250. Points corresponding to the text items are embedded in a multidimensional space in step 252 such that all pairs of points are the desired distances from each other. In step 254, the points are projected onto a two-dimensional space in which these distances are best preserved. The icons are displayed in step 256 using their corresponding point positions in the two-dimensional space.

Given any pairwise distance measures between points, it is possible to embed the points in some Euclidean space such that the points are the required distances from each other. This is due to a theorem by Young and Householder. If this space is two-dimensional, then we could use the point coordinates in the space as the coordinates for the screen display of the icons. However, this is rarely the case; usually the Euclidean space in which the points are embedded has very high dimensionality. In order to use this embedding to inform the display layout, it is necessary to project the points from the multi-dimensional Euclidean space to a two-dimensional Euclidean space. There are of course an infinite number of ways to do this projection. We would like to find the projection that best preserves the distances between points. This projection is found by using Principal Component Analysis. The principal component is any vector such that the perpendicular projections of the points from the multi-dimensional space in which they were embedded onto that vector have the largest possible variance. The second principal-component vector is any vector orthogonal to the first, such that the perpendicular projections of the points onto it have the largest possible variance. The first two principal-component vectors therefore define a desired two-dimensional Euclidean space, i.e., one that preserves the interpoint distances. In fact, it can be proved that the two-dimensional Euclidean space defined by the principal-component vectors is the best two-dimensional space for preserving these distances. Once the points have been projected onto this two-dimensional space, the point coordinates can be used as the locations of the corresponding icons in the screen display.

Figure 6:
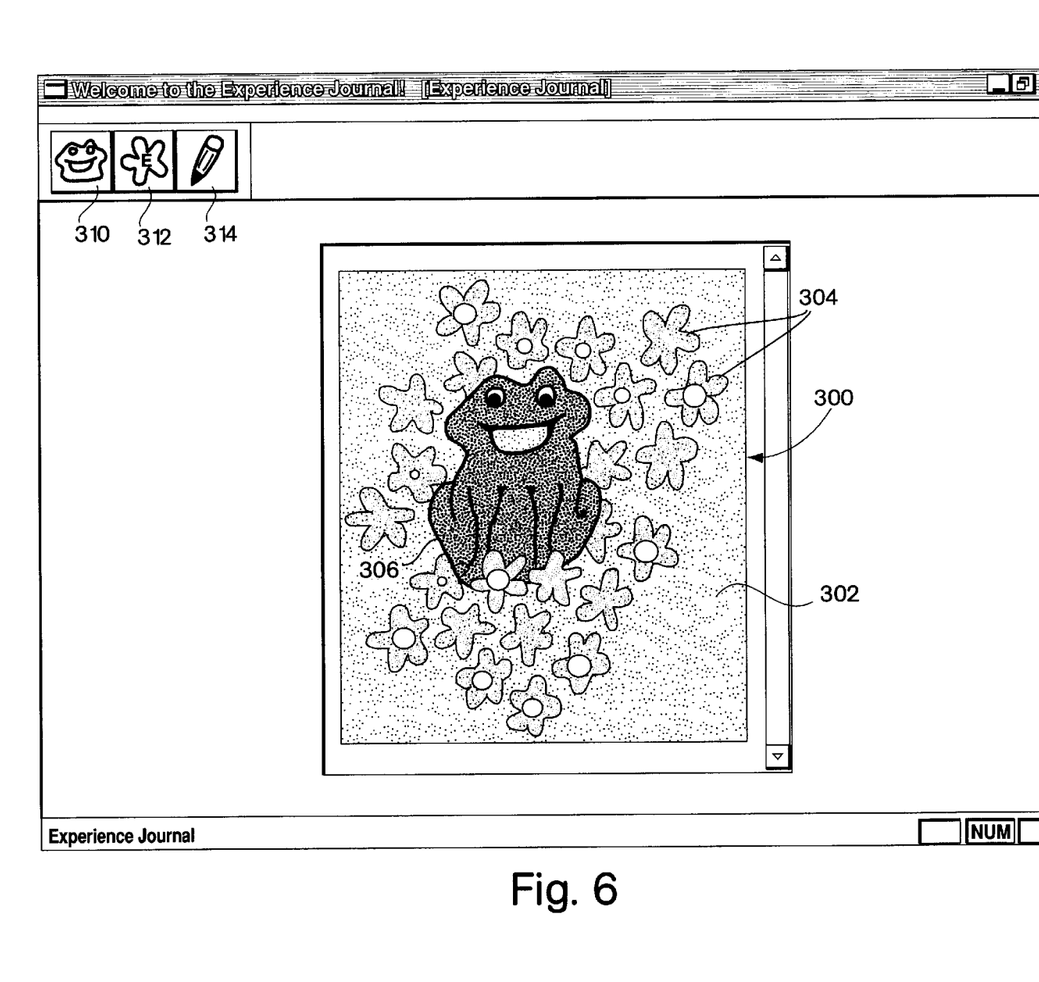
FIG. 6 illustrates an example of a welcome display window that may be used in the experience journal.
Figure 8:
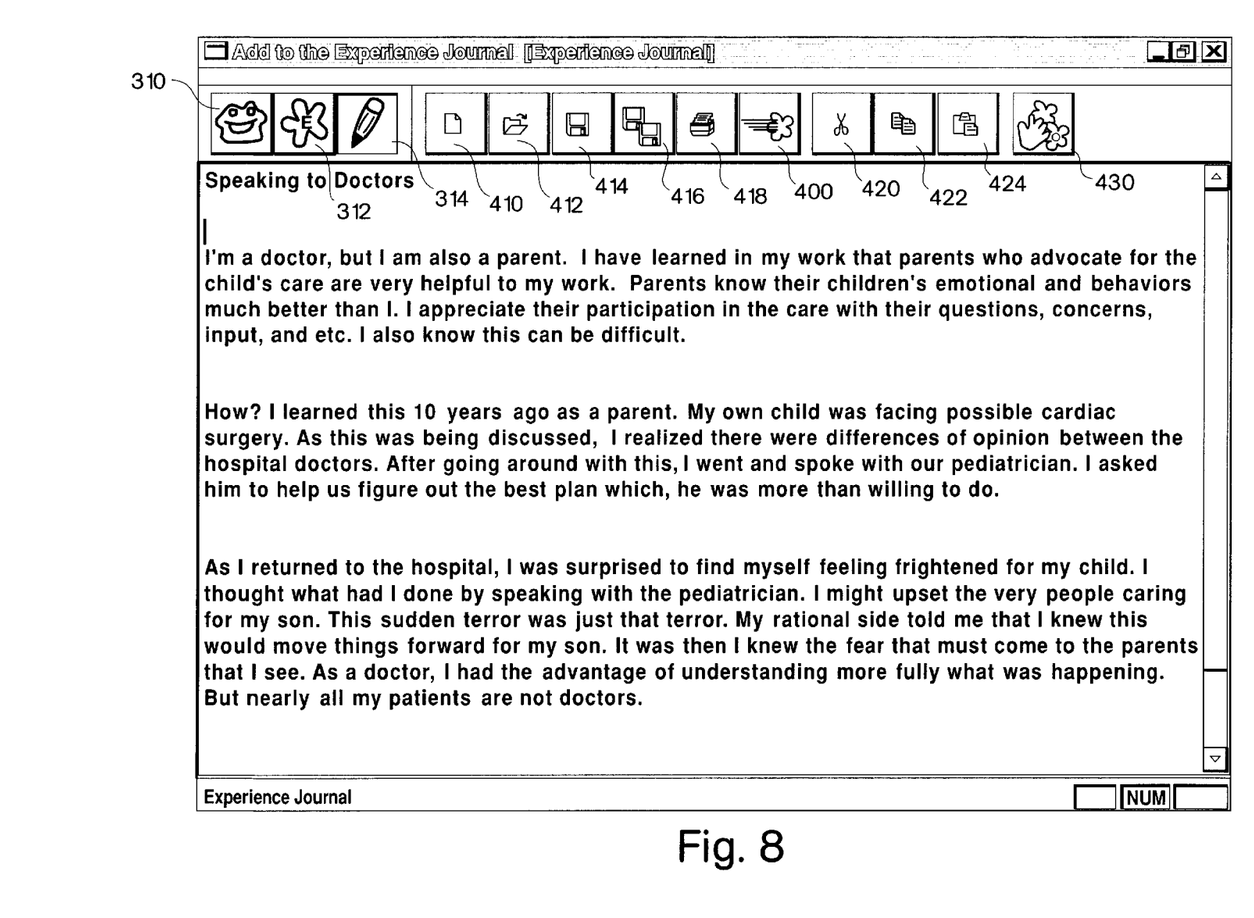
FIG. 8 illustrates an example of a display window for entry of a text item into the experience journal.

Examples of display screens that may be utilized in implementing the computerized experience journal of the present invention are shown in FIGS. 6–9. An example of a welcome display is shown in FIG. 6. A welcome display window 300 includes a pond 302 having lilypad icons 304 and a frog icon 306. By pointing and clicking on various components of the welcome display window 300, different informational messages are given to the user. Menu buttons at the top of the display may be used for selecting other windows in the experience journal. A button 310 is used for selecting the welcome display window 300. A button 312 is used for selecting a "read" display as shown in FIG. 7. A button 314 is used for selecting a "write" display as shown in FIG. 8.

The read display, an example of which is shown in FIG. 7, is used for accessing and reading text items in the experience journal. The icon display window 116 includes icons, such as lily pad icons 110, 112, 114, etc., distributed in a background area, such as a pond 332. As discussed above, each of the icons corresponds to one of the text items in the experience journal. Distances between icons in display window 116 are representative of similarity between the corresponding text items. Thus, icons are closely spaced when the corresponding text items are relatively similar, and icons are widely spaced when corresponding text items are relatively dissimilar. The read display further includes text window 136 for displaying a selected text item, such as text item 132. The corresponding icon 134 may be highlighted in the icon display window. A new text item may be selected by pointing to one of the icons and clicking the pointing device. The user may select similar text items by selecting icons that are clustered together and may select dissimilar text items by selecting icons that are widely spaced.

Additional optional features may be included in the read display. For example, the icon display window 116 may indicate the age of text items in the experience journal. In particular, the intensity of the icons may indicate the time from acceptance into the experience journal. Newer text items are represented by relatively intense icons, whereas older text items are represented by less intense, faded icons. An icon representative of a particular text item is initially intense following acceptance and fades with time toward the background color. The icons never disappear entirely but instead reach a minimum intensity level. The aging of the display may be accomplished by attaching a time stamp indicative of the time of acceptance to each text item. The intensity of the corresponding icon is based on a difference between the present time and the time of acceptance. It will be understood that display parameters other than intensity may be utilized to indicate the ages of the text items.

In another example of an optional feature, the icon display window 116 may indicate a trail of text items selected by the user. The trail may be indicated, for example, by icons of a selected color, with successively reduced brightness indicating less recently accessed text items. The selected color is different from the color of text items that have not been selected by the user.

An additional optional feature is the ability to magnify a portion of the icon display window 116. Magnification buttons 350, 352, 354, etc. may be provided at the top of the display screen. Different magnification buttons provide different magnification factors. When one of the magnification buttons 350, 352, 354, etc. is selected, a magnified region 360 appears in icon window 116. Within magnified region 360, the distances between icons are magnified to facilitate selection of a text item. The magnification feature is useful in the case of clusters of icons which represent similar text items. The magnified region 360 may be moved in the icon window 116 using the pointing device. A button 370 is used to establish a view at normal scale without magnification.

An additional optional feature is associated with icons 380, 382, 384, etc. positioned below icon window 116. Icons 380, 382, 384 represent linked text items in the experience journal. The text items may be linked according to similarity or according to another criteria. By selecting one of the icons 380, 382, 384 etc., the corresponding linked text item is accessed and is displayed in text window 136.

The experience journal icon display window has been described as including lilypad icons on a pond background. It will be understood that any suitable icons and any suitable background may be utilized within the scope of the present invention. Different backgrounds, such as for example a cityscape or a sunset, may be utilized as appropriate for a particular application of the experience journal. Furthermore, the buttons on the experience journal display may be changed to provide different options and functions as necessary for a particular application.

Figure 9:
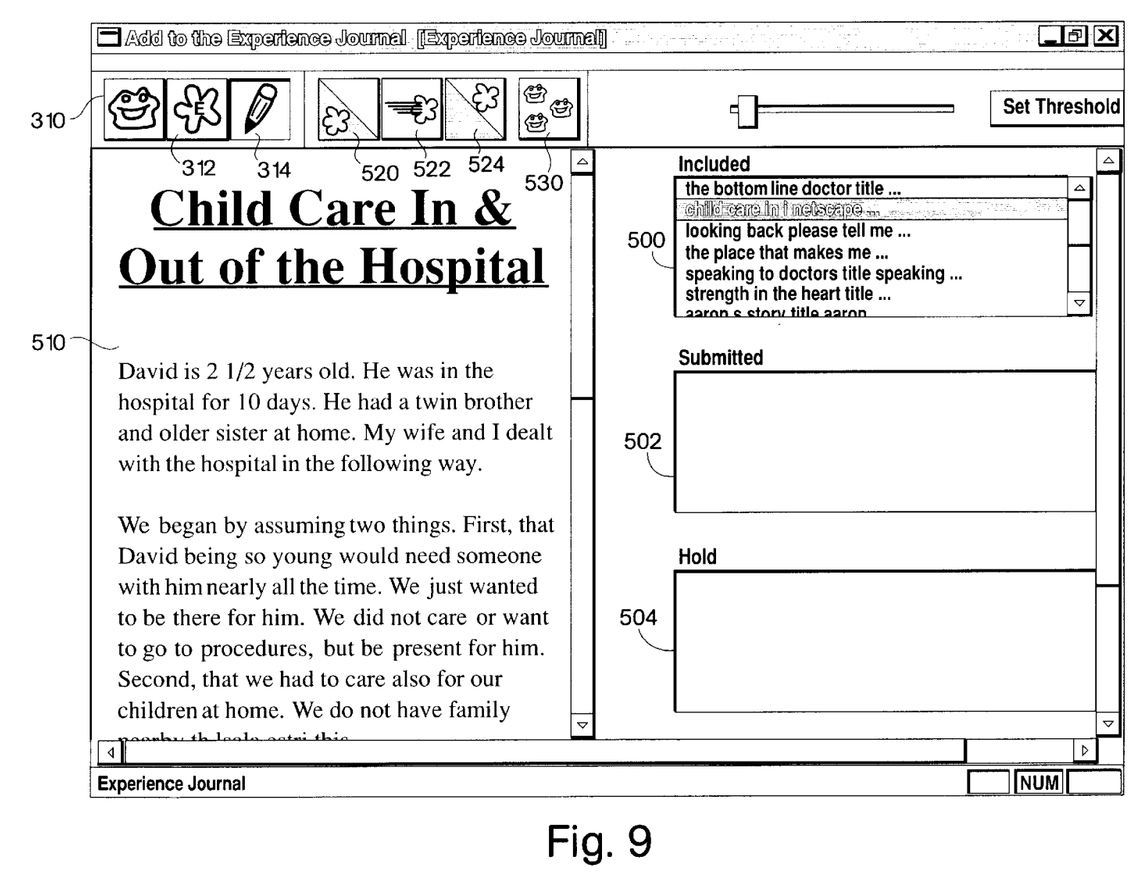
FIG. 9 illustrates an example of a display window for control of the experience journal by a screening committee.

An example of a write display for adding text items to the experience journal is shown in FIG. 8. The user enters a narrative text, with few if any restrictions, using keyboard 20 (FIG. 1). After the text item is completed to the satisfaction of the user, it can be submitted to the experience journal for review and editing by the review board by selecting button 400. This causes the new text item to be sent on the network to the control computer 30 (FIG. 2). Conventional text entry functions may be provided in the write display. In the example of FIG. 8, the write display includes a new document button 410, an open document button 412, a save button 414, a save copy button 416, a print button 418, a cut button 420, a copy button 422 and a paste button 424. A button 430 may provide access to an administrative display, an example of which is shown in FIG. 9 and described below. A password may be required for access to the administrative display.

An example of an administrative display used by the screening committee in the control computer is shown in FIG. 9. An "included" window 500 shows a list of text items previously included in the experience journal by title. A "submitted" window 502 indicates text items submitted by users for entry into the experience journal but not yet reviewed by the screening committee. A "hold" window 504 lists text items that have been submitted but which have been placed on hold for further review and/or editing. A "text" window 510 displays a selected text item from one of the windows 500, 502 or 504. The text item in window 510 may be edited by the screening committee to eliminate material that can be medically harmful or legally compromising to the hospital or other organization. When the text item is accepted by the screening committee, it may be included in the experience journal by selecting button 520. Thus, button 520 causes a selected text item to be transferred from submitted window 502 to included window 500. The processes described above for determining similarity between the new text item and the other text items in the experience journal and for positioning an icon in the icon window are executed. A new icon corresponding to the newly entered text item then appears in the icon window. The new text item is then available for selection by users in the read display.

Additional function buttons on the administrative display include a button 522 for transferring a text item from hold window 504 to submitted window 502. A button 524 transfers a selected text item from submitted window 502 to hold window 504. A button 530 selects a dialog box that may be used to access a different experience journal or to create a new experience journal. Button 530 is used in connection with systems that may provide access to more than one experience journal.

The experience journal has been described thus far in connection a medical application wherein the experience journal contains stories and other narratives relating to an illness. However, the experience journal may be utilized in any situation where a community wishes to share unstructured information relating to a particular topic or issue. The experience journal is particularly useful where the entries are unrestricted as to style, content and form and where the experience journal may be accessed by users having very limited computer skills. In some applications, the screening committee, which edits and accepts entries in the experience journal, may be unnecessary. In this case, newly submitted text items are included directly in the experience journal without editing or review. Likewise, in some applications, states of the experience journal may be fixed for periodic distribution.

Having thus described certain embodiments of the present invention, various alterations, modifications, and improvements will readily occur to those skilled in the art. Such alterations, modifications, and improvements are intended to be within the spirit and scope of the invention. Accordingly, the foregoing description is by way of example only, and not intended to be limiting. The invention is limited only as defined in the following claims and the equivalents thereof.

What is claimed is:

1. A method for displaying icons representing information items stored in a database, comprising the steps of:

determining similarity between each of a plurality of information items in a database and every other one of the plurality of information items in the database; and displaying a plurality of icons, each icon corresponding to a respective one of the plurality of information items in the database, on a display screen such that the determined similarity between each information item in the database and every other information item in the database is represented by a position of each of the displayed plurality of icons.

2. The method of claim 1, wherein determining similarity between each of the plurality of information items and every other one of the plurality of information items comprises the step of:

determining a similarity score between each of the plurality of information items and every other one of the plurality of information items.

3. The method of claim 2, wherein positioning the plurality of icons comprises the steps of:

embedding points corresponding to each of the plurality of information items in a multidimensional space such that pairs of points are spaced by distances representative of the similarity score for the corresponding pair of information items;

projecting the points onto a two-dimensional space in which the distances between the points are preserved; and displaying the plurality of corresponding icons using their corresponding point positions in the two-dimensional space.

4. The method of claim 1, wherein positioning the plurality of icons includes multidimensional scaling of the determined similarities among the plurality of information items.

5. The method of claim 1, further comprising the steps of:

linking similar one of the plurality of information items; and indicating the linked ones of the plurality of information items by marking the corresponding ones of the plurality of icons on the display screen.

6. The method of claim 1, wherein:

each of the plurality of information items is associated with a vector; and determining similarity between each of the plurality of information items in the database and every other one of the plurality of information items in the database includes comparing each of the associated vectors with every other one of the associated vectors.

7. The method of claim 1, wherein:

each of the plurality of information items is associated with a vector; and determining similarity between each of the plurality of information items in the database and every other one of the plurality of information items in the database includes computing the dot product of each of the associated vectors with every other one of the associated vectors.

8. A method for displaying icons representing information items stored in a database, comprising the steps of:

determining similarity between each of a plurality of information items in a database and every other one of the plurality of information items in the database; and displaying a plurality of icons, each icon corresponding to a respective one of the plurality of information items in the database, on a display screen such that the determined similarity between each information item in the database and every other information item in the database is represented by a position of each of the displayed plurality of icons;

wherein displaying the plurality of icons includes indicating a relative age of each of the corresponding information items relative to each of the other information items.

9. The method of claim 8, wherein indicating relative ages of information items includes varying a parameter of the corresponding icon in accordance with the age of the corresponding information item.

10. A method for displaying icons representing information items stored in a database, comprising the steps of:

determining similarity between each of a plurality of information items in a database and every other one of the plurality of information items in the database;

displaying a plurality of icons, each icon corresponding to a respective one of the plurality of information items in the database, on a display screen such that the determined similarity between each information item in the database and every other information item in the database is represented by a position of each of the displayed plurality of icons;

determining similarity between a new information item and each of the plurality of information items; and displaying a new icon corresponding to the new information item such that the position of the new icon relative to each of the plurality of icons represents the determined similarities among the plurality of information items and the new information item.

11. Apparatus for providing access to an experience journal including unstructured text items relating to a topic, said apparatus comprising:

a computer system including a processor, a storage device, a video display unit having a display screen, and a user interface, said computer system further comprising:

means for storing the unstructured text items in the storage device;

means for determining similarity among the unstructured text items;

means for displaying icons, one corresponding to each of the unstructured text items, on the display screen, including means for positioning said icons relative to each other such that the distances between said icons are representative of the determined similarities among the unstructured text items; and means responsive to user selection of one of said icons for displaying the corresponding unstructured text item on the display screen.

12. The apparatus of claim 11, wherein the means for determining similarity comprises a processor configured to:

determine a similarity score between each of the plurality of unstructured text items and every other one of the plurality of unstructured text items by determining the dot product of corresponding word vectors of each of the plurality of unstructured text items and every other one of the plurality of unstructured text items to determine similarity among the plurality of unstructured text items.

13. The apparatus of claim 12, wherein the means for positioning the icons comprises a video display unit configured to:

embed points corresponding to the plurality of unstructured text items in a multidimensional space such that pairs of points are spaced by distances representative of the similarity score for the corresponding pair of unstructured text items;

project the points onto a two-dimensional space in which the distances between said points are preserved; and display the plurality of associated icons using their corresponding point positions in the two-dimensional space to position the plurality of associated icons.

14. The apparatus of claim 11, wherein the means for displaying the icons comprises a video display unit configured to:

display the plurality of icons with an indication of the relative age of each of the corresponding unstructured text items relative to every other one of the plurality of unstructured text items in the experience journal.

15. The apparatus of claim 11, wherein the means for positioning the icons comprises a video display unit configured to:

multidimensionally scale the determined similarities among the plurality of unstructured text items to position the plurality of icons.

16. The apparatus of claim 11, further comprising:

a processor configured to link similar ones of the plurality of unstructured text items; and a video display unit configured to indicate the linked ones of the plurality of unstructured text items by marking the corresponding icons on the display screen.

17. A system for determining similarity between information items, comprising:

a processor configured to generate a plurality of vectors, each of the plurality of vectors based upon information contained in a corresponding one of a plurality of information items, and to determine similarity between each of the plurality of information items and every other one of the plurality of information items based upon the generated plurality of vectors; and a storage device configured to store the plurality of information items, the plurality of vectors, and the results of determining similarity between each of the plurality of information items and every other one of the plurality of information items based upon the generated plurality of vectors.

18. The system of claim 17, wherein:

the processor is further configured to compare each of the plurality of vectors with every other one of the plurality of vectors to determine similarity between each of the plurality of information items and every other one of the plurality of information items; and wherein the storage device is further configured to store the results of the comparison of each of the plurality of vectors with every other one of the plurality of vectors.

19. The system of claim 17, wherein:

the processor is further configured to compute a plurality of dot products, each dot product being the dot product of each of the plurality of vectors with every other one of the plurality of vectors, to determine similarity between each of the plurality of information items and every other one of the plurality of information items; and wherein the storage device is further configured to store the computed plurality of dot products.

20. A system for maintaining a database, comprising:

an expandable storage device configured to store a plurality of data items having a determined relationship;

an input device for adding a new data item to the system; and a processor configured to determine a relationship between the new data item and each of the plurality of stored data items and to add the new data item to the storage device.

21. A method for maintaining a database, comprising the steps of:

receiving a new data item;

processing the new data item to determine a relationship between the new data item and each of a plurality of data items having previously determined relationships; and storing the new data item in a storage device containing the plurality of data items.

\* \* \* \* \*